(12) United States Patent
Nieh et al.

(10) Patent No.: US 11,907,449 B2
(45) Date of Patent: *Feb. 20, 2024

(54) CONTROL KNOB WITH MOTION SENSING FOR CONTROLLING OPERATION OF A MACHINE

(71) Applicants: Defond Electech Co., Ltd., Guangdong (CN); Defond Components Limited, Chai Wan (HK)

(72) Inventors: Cheng Chen Nieh, Chai Wan (HK); Chi Ming Lai, Chai Wan (HK)

(73) Assignees: Defond Electech Co., Ltd., Guangdong (CN); Defond Components Limited, Chai Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,423

(22) Filed: Feb. 10, 2020

(65) Prior Publication Data

US 2020/0272247 A1  Aug. 27, 2020

(30) Foreign Application Priority Data

Feb. 25, 2019  (HK) .................................. 19119983.5

(51) Int. Cl.
*G06F 3/0362* (2013.01)
*G06F 3/01* (2006.01)
(Continued)

(52) U.S. Cl.
CPC ............ *G06F 3/0362* (2013.01); *G06F 3/016* (2013.01); *G06F 3/041* (2013.01);
(Continued)

(58) Field of Classification Search
CPC ........ G06F 3/0362; G06F 3/016; G06F 3/041; G06F 3/04847; G06F 3/04883;
(Continued)

(56) References Cited

U.S. PATENT DOCUMENTS 10,649,556 B2 *  5/2020  Chu ........................ H03K 17/96
2008/0058022 A1 *  3/2008  Ahn ....................... G06F 3/0362
455/566

(Continued)

FOREIGN PATENT DOCUMENTS

| CN | 1517845 A | 8/2004 |
| CN | 101339859 A | 1/2009 |
| CN | 205581786 U | 9/2016 |

*Primary Examiner* — Jimmy H Nguyen
(74) *Attorney, Agent, or Firm* — Kolisch Hartwell, P.C.

(57) ABSTRACT

A control knob for controlling operation of a machine, the control knob including: an attachment surface configured for attaching the control knob to a surface of the machine; a display member comprising an electronic display module disposed thereon; a motion sensor configured for sensing motion of the user's hand, said sensor being operably-connected to the display member such that, responsive to the motion sensor sensing motion of the user's hand, the display member is configured to switch operation from a sleep mode into an active mode; an operational mode display controller for controlling display of operational modes of the machine upon the electronic display module, said operational mode display controller being configured for rotational movement around the electronic display module amongst a plurality of rotational positions, said operational mode display controller being operably connected with the electronic display module such that, responsive to the rotational movement of the operational mode display controller amongst the plurality of rotational positions, the electronic display module is configured to display a plurality of operational modes of the machine corresponding to the plurality of rotational positions; and an operational mode selector for controlling selection of one of the plurality of operational modes of the machine when said one of the plurality of operational modes is displayed on the electronic display module, the operational mode selector being configured for depressible move- (Continued)

ment to actuate selection of the operational mode displayed on the electronic display module.

10 Claims, 4 Drawing Sheets

(51) Int. Cl.
*G06F 3/041* (2006.01)
*G06F 3/04847* (2022.01)
*G06F 3/04883* (2022.01)
*G06F 3/14* (2006.01)

(52) U.S. Cl.
CPC ...... *G06F 3/04847* (2013.01); *G06F 3/04883* (2013.01); *G06F 3/14* (2013.01)

(58) Field of Classification Search
CPC ........ G06F 3/14; G06F 3/0393; G06F 1/3231; G06F 1/3262; Y02D 10/00
USPC .................................................. 345/173, 184
See application file for complete search history.

(56) References Cited

U.S. PATENT DOCUMENTS

| | | | |
|---|---|---|---|
| 2015/0241195 A1* | 8/2015 | Schenkewitz | H03K 17/975 324/658 |
| 2018/0164903 A1* | 6/2018 | Chu | G06F 3/0482 |

\* cited by examiner

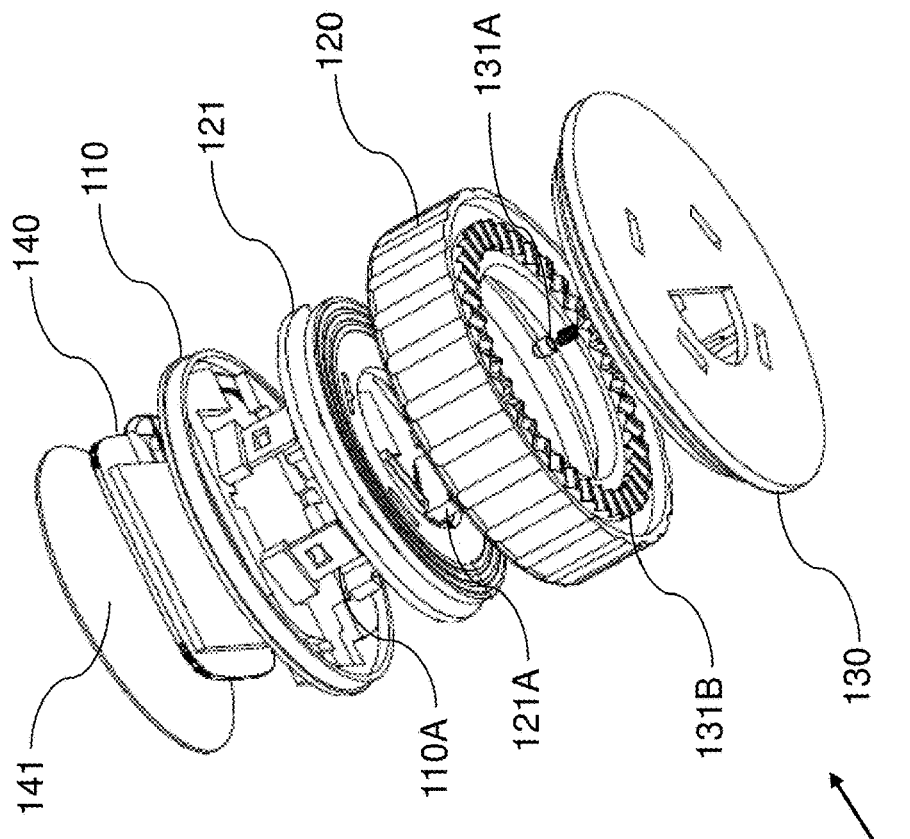
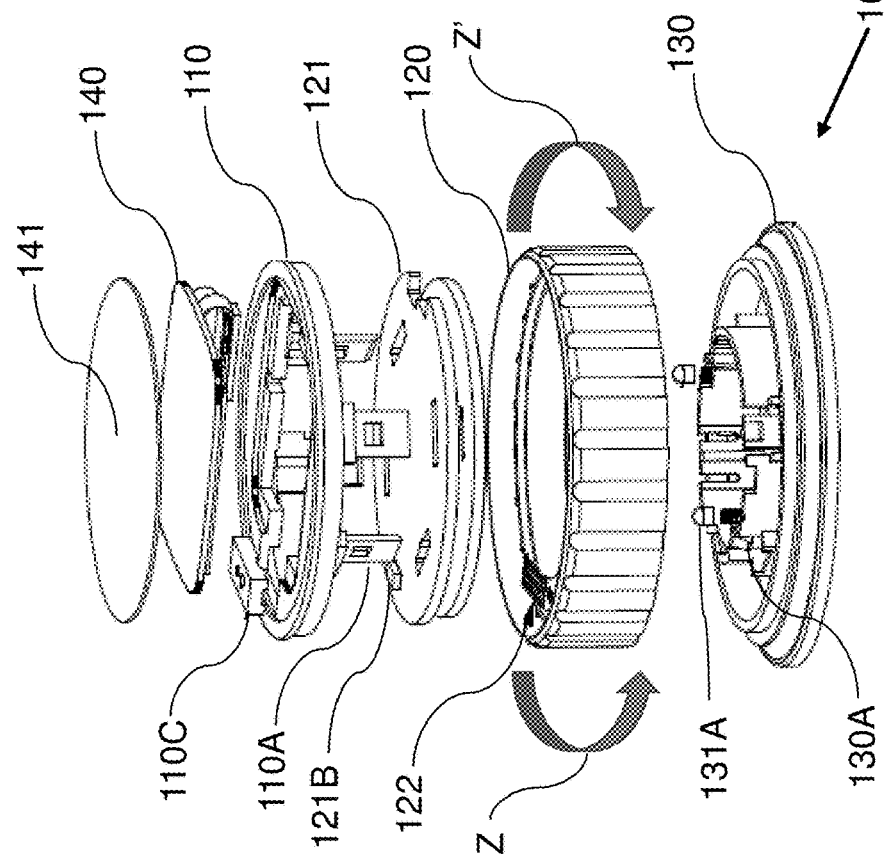
*FIG. 3A*
*FIG. 3B*

CONTROL KNOB WITH MOTION SENSING FOR CONTROLLING OPERATION OF A MACHINE

TECHNICAL FIELD

The present invention relates to the field of control knobs and control buttons for controlling operation of machines.

BACKGROUND OF THE INVENTION

Control panels of machines such as electrical home appliances (e.g. microwave ovens, washings machines, dryers) and motor vehicles typically include multiple control knobs (control buttons and the like) to control various operational modes of such machines. A transducer will typically sense the different rotational positions of a control knob and then output electrical control signals that are indicative of the sensed roatational positions (and hence the desired operational modes of the machine as selected by the user). For instance, multiple control knobs may be disposed on a control panel of a microwave oven to control such operational modes as the heating time, heating temperature, and defrosting time. Alternately, a control panel in a motor vehicle may for instance comprise multiple control knobs for operating the air-conditioning, the radio, and the sunroof. Furthermore, an electronic display may typically be disposed on the control panel next to the control knobs to visually display the selected operational modes of the machine that have been selected by the user. However, as the space that is available on the control panels of such machines is finite (and even more so in the context of machines with compact design aesthetics), there is a perceived need for control knobs which improve the spatial utilisation of control panel space on such machines without unduly compromising ease and speed of operation of the control panel. Moreover, in seeking to address this problem, it may be also advantageous to provide a solution which alleviates power wastage particularly in battery powered appliances.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides a control knob for controlling operation of a machine, the control knob including: an attachment surface configured for attaching the control knob to a surface of the machine; a display member comprising an electronic display module disposed thereon; a motion sensor configured for sensing motion of the user's hand, said sensor being operably-connected to the display member such that, responsive to the motion sensor sensing motion of the user's hand, the display member is configured to switch operation from a sleep mode into an active mode; an operational mode display controller for controlling display of operational modes of the machine upon the electronic display module, said operational mode display controller being configured for rotational movement around the electronic display module amongst a plurality of rotational positions, said operational mode display controller being operably connected with the electronic display module such that, responsive to the rotational movement of the operational mode display controller amongst the plurality of rotational positions, the electronic display module is configured to display a plurality of operational modes of the machine corresponding to the plurality of rotational positions; and an operational mode selector for controlling selection of one of the plurality of operational modes of the machine when said one of the plurality of operational modes is displayed on the electronic display module, the operational mode selector being configured for depressible movement to actuate selection of the operational mode displayed on the electronic display module.

Preferably, the operational mode selector may comprise at least one of the (i) display member, and (ii) the operational mode display controller.

Preferably, the electronic display module may includes a touchscreen display and whereby the touchscreen display is operable by a user to perform at least one of:
(a) sensing a touch input applied to the touchscreen display;
(b) varying the operational modes that are displayed on the touchscreen display, in response to the sensed touch input; and
(c) selecting one of the plurality of operational modes when said one of the plurality of operational modes is displayed on the electronic display module.

Preferably, the touch input may include a swiping input.

Preferably, the motion sensor may include a contactless motion sensor.

Preferably, the operational mode selector may be configured for at least one of tilting movement, pivoting movement, and sliding movement between at least the first position and the second position to actuate selection of the operational mode displayed on the electronic display module.

Preferably, the present invention may include a mechanism configured for vibrating the control knob in response to the operational mode selector being moved to actuate selection of an operational mode of the machine.

Preferably, the electronic display module may be configured to output at least one of a predefined colour or brightness in response to the operational mode selector being moved to actuate selection of an operational mode of the machine.

Preferably, the control knob may include a sound emitter configured to output a predefined sound in response to the operational mode selector being moved to actuate selection of an operational mode of the machine.

Preferably, the present invention may include a wireless communication module configured for communication with a wireless communication module of an external device, said external device including at least one of (i) the machine (ii) a smartphone device, and (iii) a personal computer.

Preferably, the wireless communication module may include at least one of a Wi-Fi and a Bluetooth type wireless communication module.

In a second broad form, the present invention provides a control knob for controlling operation of a machine, the control knob including: an attachment surface configured for attaching the control knob to a surface of the machine; a display member comprising an electronic display module disposed thereon; a motion sensor configured for sensing motion of the user's hand, said sensor being operably-connected to the display member such that, responsive to the motion sensor sensing motion of the user's hand, the display member is configured for at least one of: (i) controlling display of operational modes of the machine upon the electronic display module; and (ii) controlling selection of one of the plurality of operational modes of the machine when said one of the plurality of operational modes is displayed on the electronic display module.

In another broad form, the present invention provides a machine including a control knob in accordance with the first and second broad forms of the present invention.

BRIEF DESCRIPTION OF THE DRAWINGS

The present invention will become more fully understood from the following detailed description of a preferred but non-limiting embodiments thereof, described in connection with the accompanying drawings, wherein:

FIGS. 3A and 3B depict exploded perspective views of the embodiment of the present invention shown in FIGS. 2A and 2B.

DETAILED DESCRIPTION OF THE PREFERRED EMBODIMENTS

Figure 1:
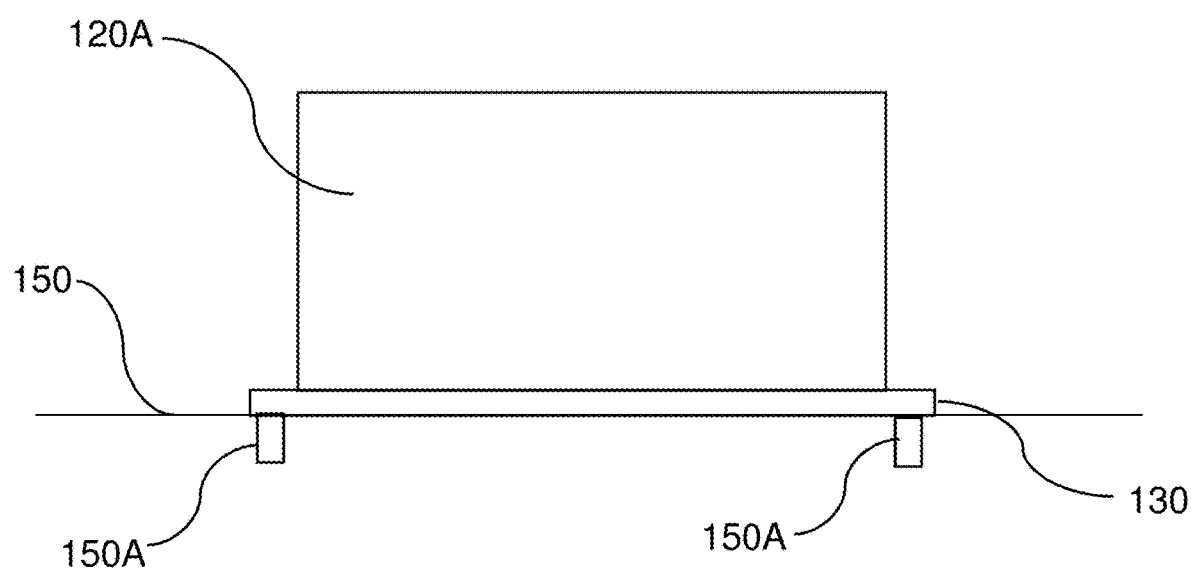
FIG. 1 depicts a side view of a control knob mounted to a control panel surface of an electrical appliance in accordance with an embodiment of the present invention.

Preferred embodiments of the present invention will now be described herein with reference to FIGS. 1 to 4 in the form of a control knob which may be utilised in a variety of applications. For instance, it may be mounted on the console of a motor vehicle for controlling a car radio, air conditioning, and other functions. Alternately, the control knob may be mounted on the control panel of a microwave oven, washing machine, vacuum cleaner, coffee maker, or other electrical home appliance, and configured for displaying and selecting operational modes of such machines.

In one embodiment, the control knob (100) includes an attachment surface (130) which is configured for mounting to a control panel surface (150) of a machine (440). The attachment surface (130) may for instance comprise a rigid metal or plastic annular configuration having one or more apertures disposed therein so that screws or other fastening members (150A) may pass through to effect securement of the control knob (100) to the control panel surface (150).

The control knob (100) also includes an annular-shaped display member (110) comprising a suitably rigid metal material or plastic material. The display member (110) is shaped and dimensioned to allow seating of the electronic display module (140) on a recessed section of the display member (110) so that it remains in a fixed relative position on the display member (110). The electronic display module (140) comprises a touch-sensitive device to allow a user to "touch" displayed electronic indicia or icons directly on the electronic display module (140) to navigate through possible operational mode options of the machine (e.g. by swiping through a menu of mode options displayed on the electronic display surface) and/or to actuate selection of any one of the displayed operational modes. The electronic display module (140) is powered by the power supply of the machine via suitable electronic power interfacing circuitry although in alternate embodiments it may be powered by a stand-alone battery unit that may be located within the housing. A lens member (141) is fitted over the electronic display module (140).

The control knob (100) further comprises an operational mode display controller (120A) which may be gripped and rotated by the user's hand in order to control the display of operational modes of the machine upon the electronic display module (140) and/or to actuate selection of any one of the displayed operational modes. It can be seen from FIG. 2A that the operational mode display controller (120A) is rotatable about the electronic display module (140) in either an anti-clockwise direction (depicted by arrow Z) or a clockwise direction (depicted by arrow Z') in order to navigate through operational mode options displayed on the electronic display module (240). A first end of the operational mode display controller (120A) is configured for engaging with the attachment surface (130) whilst a second end of the operational mode display controller (120A) is configured for engaging with the display member (110) so as to be rotatably-movable relative to both the attachment surface (130) and the display member (110). As can be seen from the drawings, the display member (110), the operational mode display controller (120A) and the attachment surface (130) when assembled together in this manner co-operatively form a housing therebetween within which mechanical and electronic components such as a printed circuit board (121) with potentiometer and an associated potentiometer wiper (122) of the control knob (100) may be housed. The printed circuited board (121) includes an electrical connector (121A) configured for interconnection with the machine systems via wiring to effect power and/or data/signaling communication therebetween. Securement tabs (110A) extend from the display member (110) downwardly through the slots disposed in the printed circuit board (121) and extend through a central passage of the operational mode display controller (120A) so as to interference-fit together with corresponding securement tabs (130A) extending upwardly through the central passage of the operational mode display controller (120A) from the attachment surface (130). In this way, the display member (110) and the attachment surface (130) remain in fixed relative position to each other and with the machine during use of the control knob (100). However, the operational mode display controller (120A) disposed between the display member (110) and the attachment surface (130) is able to rotate about a rotational axis relative to both the display member (110) and the attachment surface (130) amongst a plurality of rotational positions.

The control knob (100) includes a detent mechanism (131A,131B) to allow for controlled incremental rotational movement of the operational mode display controller (120A) about the display member (110) into its plurality of rotational positions. In this embodiment, the detent mechanism (131A,131B) may include a spring-loaded ball-bearing or bullet (131A) extending from the attachment surface (130) upwardly towards a ridged detent surface (131B) disposed in a lower surface region of the operational mode display controller (120A). The operational mode display controller (120A) is shaped and dimensioned so that as the operational mode display controller (120A) is rotated about, the spring-loaded ball-bearing (131A) of the detent mechanism engages with troughs between the ridges of the ridged detent surface (131B) to effect controlled incremental rotational advancement of the operational mode display controller (120A).

Rotational movement of the operational mode display controller (120A) is sensed by a first sensor module (410) which may include a rotary-actuated potentiometer formed in the printed circuit board (121) working in combination with the potentiometer wiper (122), an optical sensor or any other sensor device suitable for this application. For instance, the operational mode display controller (120A) could be coupled to a transducer shaft that turns with rotation of the operational mode display controller (120A) and the rotational movement of the transducer shaft could be used to generate associated sensor readings in the sensor module (410). The first sensor module (410) is operably-connected with a microcontroller module (430) and communicates signals to the microcontroller module (430) that are indicative of the various rotational positions of the operational mode display controller (120A). The microcontroller module (430) receives the signals from the first sensor module (410) via a sensor interface and is programmed to associate the rotational position of the operational mode display controller (120A) indicated by the sensor signals with actual operational modes of the machine by reference to a predetermined lookup table programmed in to the microcontroller module (430). The microcontroller module (430) is operably-connected to the electronic display module (140) and transmits control signals to the electronic display module (140) to display information indicative of operational modes of the machine corresponding to the sensed rotational position of the operational mode display controller (120A). The operational modes of the machine (440) may include for instance, where the machine is a washer/dryer machine, the options of either hot and cold water washing operational modes, the options of various wash times, and, the option of various dryer times. Each such option may broadly be considered as an operational mode of the machine that may be selected by the user.

Figure 2A:
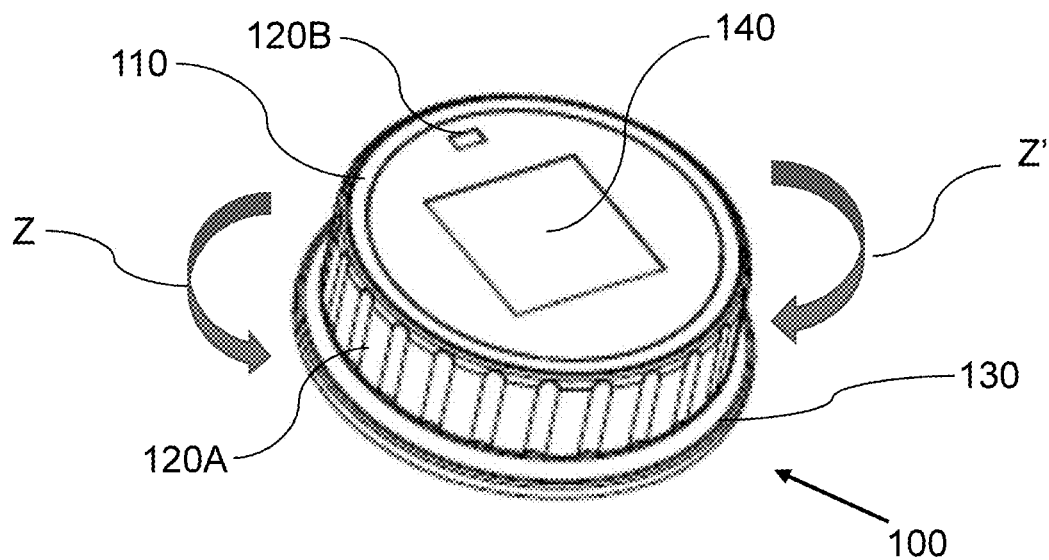
FIGS. 2A and 2B depict perspective views a control knob in accordance with the embodiment of the present invention.
Figure 2B:
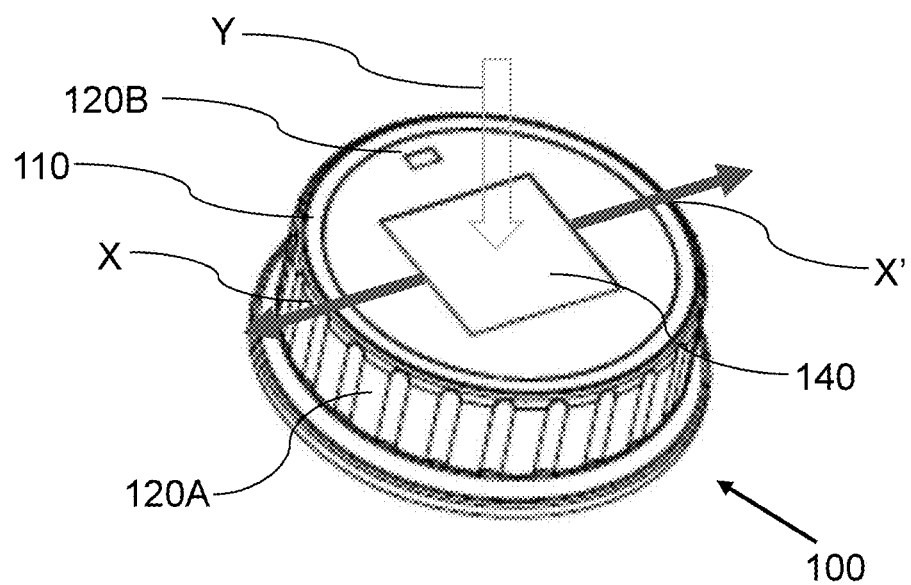
Figure 4:
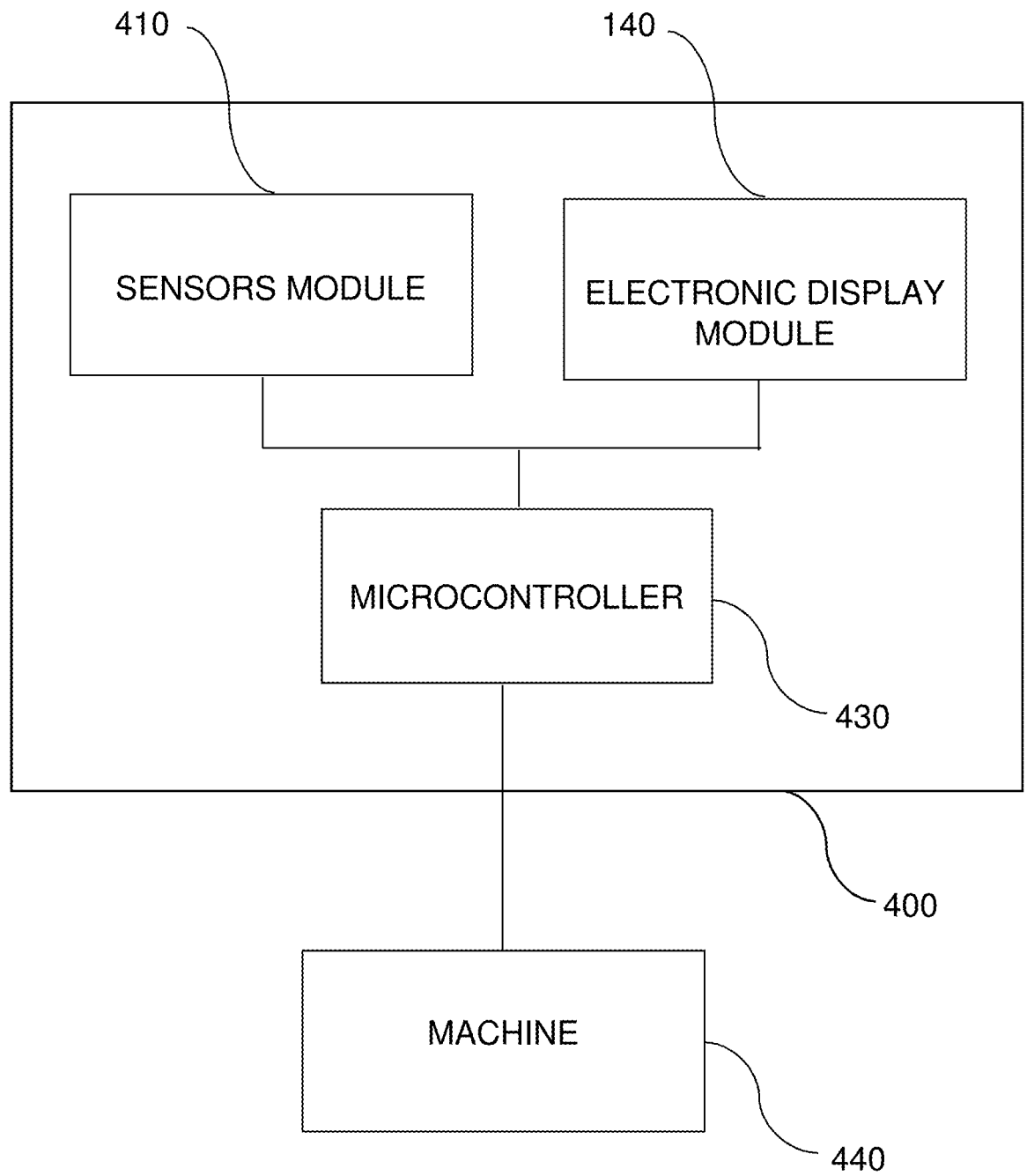
FIG. 4 depicts a functional block diagram of a control knob operably connected with an electrical appliance in accordance with the embodiment of the present invention.

In this embodiment, the electronic display module (140) may be depressed, whereby the sensor module senses this action and outputs a sensor signal which is configured to actuate selection of an operational mode currently displayed on the electronic display module (140). In FIG. 2B the arrow Y shows the direction in which the electronic display module (140) is depressible. When the electronic display module (140) is depressed, a further control signal is communicated by the sensor module (410) to the microcontroller module (430) indicative of the electronic display module (140) having being depressed by the user. The microcontroller module (430) receives the control signal from the sensor module (410) and is programmed to recognise this as being indicative of the selection of a particular operational mode currently being displayed on the electronic display module (140). Thereafter, the microcontroller module (430) communicates the selected operational mode externally of the control button (100) to a control module of the machine (440) either via electrical bus wiring, or, wirelessly via a wireless communication module.

In this embodiment, the electronic display module (140) may be configured to automatically switch operation from an active mode (in which it displays information) in to a sleep mode in which functional operation of the electronic display module (140) is partially or fully switched off until needed. The control knob (100) includes a motion sensor (121B) operably-connected to the electronic display module (140) that is configured for sensing motion of the user's hand. The motion sensor (121B) is configured for engagement within a sensor guide (110C) which protects and controls the field of motion that may be sensed by the motion sensor (121B) in use. In response to the motion sensor (121B) sensing a particular motion or gesture of the user's hand, the display member is configured to switch operation from a sleep mode into an active mode. In other embodiments, the electronic display module (140) may be configured to operate in a different manner in response to sensing of the motion or gesture of the user's hand, which need not necessarily involved switching operation of the electronic display module (140) from the sleep mode in to the active mode. Yet further, in other embodiments, different types of sensors apart from a motion sensor may be utilised for sensing proximity or movements of the user's hand so as to trigger switching of the electronic display module (140) from the sleep mode in to the active mode (or for switching operation between any two operational states). The control knob may include a programmable user interface that may allow the user to customise the nature of the hand motion or hand gesture that is recognised by the motion sensor in order for the electronic display module (140) to respond with a particular operation or output.

In the various embodiments described herein, the operational mode display controller (120A) and/or the electronic display module (140) may be further configurable for use by the user to navigate through a plurality of different operational mode menus or listings. Accordingly, multi-level menus and listings of operational mode options may be displayable and selectable via a single compact control knob (100). For instance, a user may toggle between a first menu of operational mode options relating to wash cycle duration, a second menu of operational mode options relating to wash temperature modes, and a third menu of operational mode options relating to dryer time options displayable on the electronic display module (140). Further navigation through operational mode options may be possible by swiping left or right (depicted by arrows X and X') across the touch screen interface of the electronic display module (140). The operational mode display controller (120A) and electronic display module (140) may further be configured to allow the user to display and select other information such as displaying the current operational mode settings of the machine, displaying a history log of previous operational mode selections made in respect of the machine, or, suggested default operating modes may be pre-emptively displayed to the user for possible selection. The operational mode display controller (120A) and the electronic display module (140) may be yet further configured to allow the user to control values or magnitudes of different operational modes that are selected. By way of example, the operational mode display controller (120A) and/or the electronic display module (140) may be configured for manipulation by the user to incrementally increase or decrease the temperature value of a washing machine that the user has already selected to function in accordance with a hot water wash cycle, or, to incrementally increase of decrease the wash cycle time of the washing machine.

Conveniently, as the electronic display module (140) and the operational mode display controller (120A) are integrally formed in a single control knob (100), this provides a relatively compact configuration that lends itself well towards more efficient utilisation of control panel space on a machine without compromising ease and speed of operability by the user. Furthermore, by using the motion sensor to trigger switching operation of the control knob from a sleep mode in to an active mode, this may conveniently alleviate power wastage when the control know is not being used. This is particular advantageous in battery operated appliances where battery power conservation is desirable. Yet further, the motion sensor may allow a user to operate the control knob from a distance without needing to physically touch the control knob which may be advantageous in certain applications for certain users. By way of example, if such a control knob operably-connected to a vacuum cleaner, the user need not bend over to touch the control knob to operate the control knob but may instead operate the control knob from a distance without bending over.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A control knob for controlling operation of a machine, the control knob including:
    an attachment surface configured for attaching the control knob to a surface of the machine;
    a display platform formed with a recessed section and shaped and dimensioned to allow seating of an electronic display module in the recessed section so that it remains in a fixed position on the display platform;
    a display member comprising the electronic display module disposed thereon;
    an operational mode display controller for controlling display of operational modes of the machine upon the electronic display module, said operational mode display controller being configured for rotational movement around the electronic display module amongst a plurality of rotational positions, said operational mode display controller being operably connected with the electronic display module such that, responsive to the rotational movement of the operational mode display controller amongst the plurality of rotational positions, the electronic display module is configured to display a plurality of operational modes of the machine corresponding to the plurality of rotational positions;
    an operational mode selector for controlling selection of one of the plurality of operational modes of the machine when said one of the plurality of operational modes is displayed on the electronic display module, the operational mode selector being configured for depressible movement to actuate selection of the operational mode displayed on the electronic display module;
    a contactless motion sensor for sensing motion of the user's hand, and being operably-connected to the display member to provide for sensing motion of the user's hand, with the display member being configured to switch operation of the machine from a sleep mode to an active mode when the contactless motion sensor senses motion of the user's hand;
    a sensor guide configured for controlling a field of motion within which motion of the user's hand is sensed by the contactless motion sensor to allow for switching operation of the machine from the sleep mode into the active mode;
    the contactless motion sensor is configured for engagement within the sensor guide which protects and controls the field of motion that is sensed by the contactless motion sensor in use; and
    a printed circuit board having an electrical connector configured for interconnection with machine systems via wiring to effect power and/or data/signal communication therebetween, and wherein securement tabs extend from the display platform downwardly through slots disposed in the printed circuit board and extend through a central passage of the operational mode display controller so as to engage with corresponding securement tabs extending upwardly through the central passage of the operational mode display controller from the attachment surface.

2. The control knob as claimed in claim 1 wherein the operational mode selector comprises at least one of the (i) display member, and (ii) the operational mode display controller.

3. The control knob as claimed in claim 1 wherein the electronic display module includes a touchscreen display and whereby the touchscreen display is operable by a user to perform at least one of:
    (a) sensing a touch input applied to the touchscreen display;
    (b) varying the operational modes that are displayed on the touchscreen display, in response to the sensed touch input; and
    (c) selecting one of the plurality of operational modes when said one of the plurality of operational modes is displayed on the electronic display module.

4. The control knob as claimed in claim 3 wherein the touch input includes a swiping input.

5. The control knob as claimed in claim 1 including a mechanism configured for vibrating the control knob in response to the operational mode selector being moved to actuate selection of an operational mode of the machine.

6. The control knob as claimed in claim 1 wherein the electronic display module is configured to output at least one of a predefined colour or brightness in response to the operational mode selector being depressed to actuate selection of an operational mode of the machine.

7. The control knob as claimed in claim 1 wherein the control knob includes a sound emitter configured to output a predefined sound in response to the operational mode selector being depressed to actuate selection of an operational mode of the machine.

8. The control knob as claimed in claim 1 including a wireless communication module configured for communication with a wireless communication module of an external device, said external device including at least one of (i) the machine (ii) a smartphone device, and (iii) a personal computer.

9. The control knob as claimed in claim 8 wherein the wireless communication module includes at least one of a Wi-Fi and a Bluetooth type wireless communication module.

10. The machine including the control knob in accordance with claim 1.

* * * * *